United States Patent
Alva

(10) Patent No.: US 6,624,958 B1
(45) Date of Patent: Sep. 23, 2003

(54) DEBRIS DETECTION AND ERROR RECOVERY METHOD FOR TAPE DRIVES

(75) Inventor: Mauricio Huerta Alva, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 488 days.

(21) Appl. No.: 09/605,158

(22) Filed: Jun. 27, 2000

(51) Int. Cl.$^7$ .............................. G11B 5/09; G11B 27/36
(52) U.S. Cl. .............................. 360/53; 360/31; 714/42
(58) Field of Search ........................... 360/53, 31, 25; 714/42, 721

(56) References Cited

U.S. PATENT DOCUMENTS 6,493,835 B1 * 12/2002 Gill ............................ 714/42

FOREIGN PATENT DOCUMENTS

| EP | 0281408 A2 | 9/1988 |
| GB | 2306866 A | 5/1997 |
| JP | 010258274 | 12/1987 |
| JP | 030192578 | 12/1989 |
| JP | 070141265 | 11/1993 |

* cited by examiner

Primary Examiner—Regina N. Holder

(57) ABSTRACT

A method for identifying faults contributing to a data transfer error in a tape drive. The method includes calculating and comparing a long-term error rate and a short-term error sample. Based upon such calculation and comparison, a pre-selected error recovery procedure may be initialized. The long-term error rate equals a total number of bytes of data transfer error divided by a total number of bytes processed. A short-term error sample includes a number of bytes of data transfer error in a predetermined number of sequential blocks of data divided by the total number of bytes transferred in the predetermined number of sequential blocks of data. The method calculates and monitors a predetermined number of short-term error samples for a predetermined number of sequential blocks of data defining a window. Under normal operational conditions where head/media interface is free of debris, short-term error samples would have values slightly and randomly larger or smaller than long-term error rate. As debris accumulates gradually at head/media interface, the value of succeeding short-term error samples will be larger than the long-term error rate.

18 Claims, 7 Drawing Sheets

|    | S1 | S2 | S3 | S4 | S5 | S6 | S7 | S8 | S9 | S10 |
|----|----|----|----|----|----|----|----|----|----|-----|
| C1 | S(1,1) | S(1,2) | S(1,3) | S(1,4) | S(1,5) | S(1,6) | S(1,7) | S(1,8) | S(1,9) | S(1,10) |
| C2 | S(2,1) | S(2,2) | S(2,3) | S(2,4) | S(2,5) | S(2,6) | S(2,7) | S(2,8) | S(2,9) | S(2,10) |
| C3 | S(3,1) | S(3,2) | S(3,3) | S(3,4) | S(3,5) | S(3,6) | S(3,7) | S(3,8) | S(3,9) | S(3,10) |
| C4 | S(4,1) | S(4,2) | S(4,3) | S(4,4) | S(4,5) | S(4,6) | S(4,7) | S(4,8) | S(4,9) | S(4,10) |
| C5 | S(5,1) | S(5,2) | S(5,3) | S(5,4) | S(5,5) | S(5,6) | S(5,7) | S(5,8) | S(5,9) | S(5,10) |
| C6 | S(6,1) | S(6,2) | S(6,3) | S(6,4) | S(6,5) | S(6,6) | S(6,7) | S(6,8) | S(6,9) | S(6,10) |
| C7 | S(7,1) | S(7,2) | S(7,3) | S(7,4) | S(7,5) | S(7,6) | S(7,7) | S(7,8) | S(7,9) | S(7,10) |
| C8 | S(8,1) | S(8,2) | S(8,3) | S(8,4) | S(8,5) | S(8,6) | S(8,7) | S(8,8) | S(8,9) | S(8,10) |

FIG. 6

DEBRIS DETECTION AND ERROR RECOVERY METHOD FOR TAPE DRIVES

FIELD OF THE INVENTION

The present invention relates generally to storage and retrieval of data on magnetic media and more particularly to a method of detecting a particular fault as a cause of data transfer error.

BACKGROUND

Controller electronics for a tape drive may include error correction and detection circuitry (ECC) to detect and correct data transfer errors in data retrieved from and written to a tape on a tape drive. ECC is applied to data "on-the-fly" as data is transferred to or from the media. Severe faults may render some errors unrecoverable by the ECC engine compromising integrity of the data. Tape drive firmware may include a module that may be activated to recover data which has been shown to be non-recoverable employing the ECC.

A fault causing a data transfer error may originate in the media, the read/write transducers, or drive electronics. However, it may be difficult for the controller to determine where the fault resides and consequently apply an effective recovery. Existing non-ECC error recovery methods typically consist of a sequence of predetermined error recovery procedures (ERP). An ERP may include: multiple attempts to read or write the data; a re-tensioning of the tape followed by an attempt to reread the data; changing the channel filter parameters and retry; tape head cleaning operations and other similar rehabilitative measures. These ERP are applied in a predetermined sequence regardless of the nature of the fault that caused the data error.

In an attempt to reread the data, the tape is reversed and repositioned back to a ramp-up point before the target data block and accelerated to the target data block to be read (or written) again. Every time an attempt to reread the data fails, the tape is reversed, repositioned and then forwarded for the next attempt to reread the data. If the non-ECC recovery consists of a sequence of 20 retries, then the tape has to be repositioned 20 times making the error recovery attempt very time consuming. The same sequence of ERP is applied regardless of the nature of the fault that caused the read failure. Some of the ERP may not remove the fault and, to that extent, they are applied unnecessarily wasting time. In the event that the data transfer error is caused by debris at the head/media interface, multiple read or write cycles most likely will not result in recovery of data.

Other solutions for recovering lost data not recovered by ECC have relied on a brute force approach to recover data. These methods are extremely memory intensive and hence costly.

SUMMARY

The present invention is directed to a method for identifying faults that contribute to a data transfer error. In one aspect of the invention, the method identifies a relatively high probability that a specific fault is causing a data transfer error. In one case, the method is applied to identify a relatively high probability that data transfer error is caused by debris at a head/media interface. The method includes a data error comparison step followed by the application of an error recovery procedure or a sequence of error recovery procedures having a relatively higher probability of eliminating the fault allowing quicker recovery of the data.

Normally, data is written on tape in blocks. According to the present invention, a short-term error sample is defined as the number of bytes of data transfer error in a predetermined number of data blocks, divided by the total number of bytes transferred in the predetermined number of data blocks. A window is defined by a predetermined number of short-term error samples. A short-term error sample process monitors the predetermined number of short-term error samples within the window. The long-term error rate is defined as the total number of bytes in error for all data blocks transferred divided by the total number of bytes transferred in all data blocks.

During normal operating conditions, where the head/media interface is free of debris, short-term data error rate samples may exhibit values slightly and randomly larger or smaller than the long-term error rate value. As debris accumulates gradually at the head/media interface, the electrical signal picked by the transducer weakens gradually and consequently the short-term error samples will gradually degrade compared to the long-term error rate. Short-term error sample degradation may be evidenced by a weakening signal picked up by the transducer due to accumulation of debris. As debris accumulates, the number of bytes in error increases and, consequently values for short-term error rate samples increase. Degradation may also be indicated by a gradual yet consistent increase of short-term error sample values. Alternatively, in the event that debris attaches at the head-media interface abruptly, values for all short-term data error samples will be greater than the long-term error rate.

In one embodiment of the invention, short-term data error samples and a long-term data error rate are monitored and calculated. In the event that the ECC engine fails to recover data, a non-ECC error recovery module may be invoked. The non-ECC error recovery module compares short-term data error samples and their deviation from the long-term error rate. If values for short-term error samples have deteriorated gradually compared to the long-long-term error rate, then it is likely that the data transfer error is caused by debris at the head/media interface. Since debris at the head/media interface can affect one or more channels, long-term error rates and short-term error samples may be monitored for all channels. For example, short-term error samples may be defined as $S(j,k)$ where j is the channel number and k is the sample number. Long-term error rate may be defined as $L(j)$, where j is the channel number. If all $S(j,k)>L(j)$, then a head-clean cycle is invoked followed by an attempt to reread the data. If $S(j,1)<S(j,2)<\ldots<S(j,10))$, then a head-clean cycle is invoked followed by an attempt to reread the data. In either case, the head-clean cycle operates to remove debris accumulated at the head/media interface. If short-term error samples have neither deteriorated gradually nor abruptly then the data transfer error is commonly caused by a transient condition and a simple attempt to reread the data is oftentimes sufficient to recover data.

This invention may reduce the time to perform non-ECC error recovery procedures as unnecessary error recovery procedures are not performed. This invention may be employed in a linear tape drive where multiple read/write elements are used to read/write data simultaneously on data tracks on the magnetic tape. The method of debris detection according to the present invention may reduce the time taken to recover data, increasing the data transfer rate performance. The invention is simple and consequently reduces the amount of system memory used, reducing the cost of implementation.

DESCRIPTION OF THE DRAWINGS

FIG. 6 is schematic diagram depicting a short-term error sample identifier for an eight channel tape drive including sequential short-term error samples;

DESCRIPTION

Figure 1:
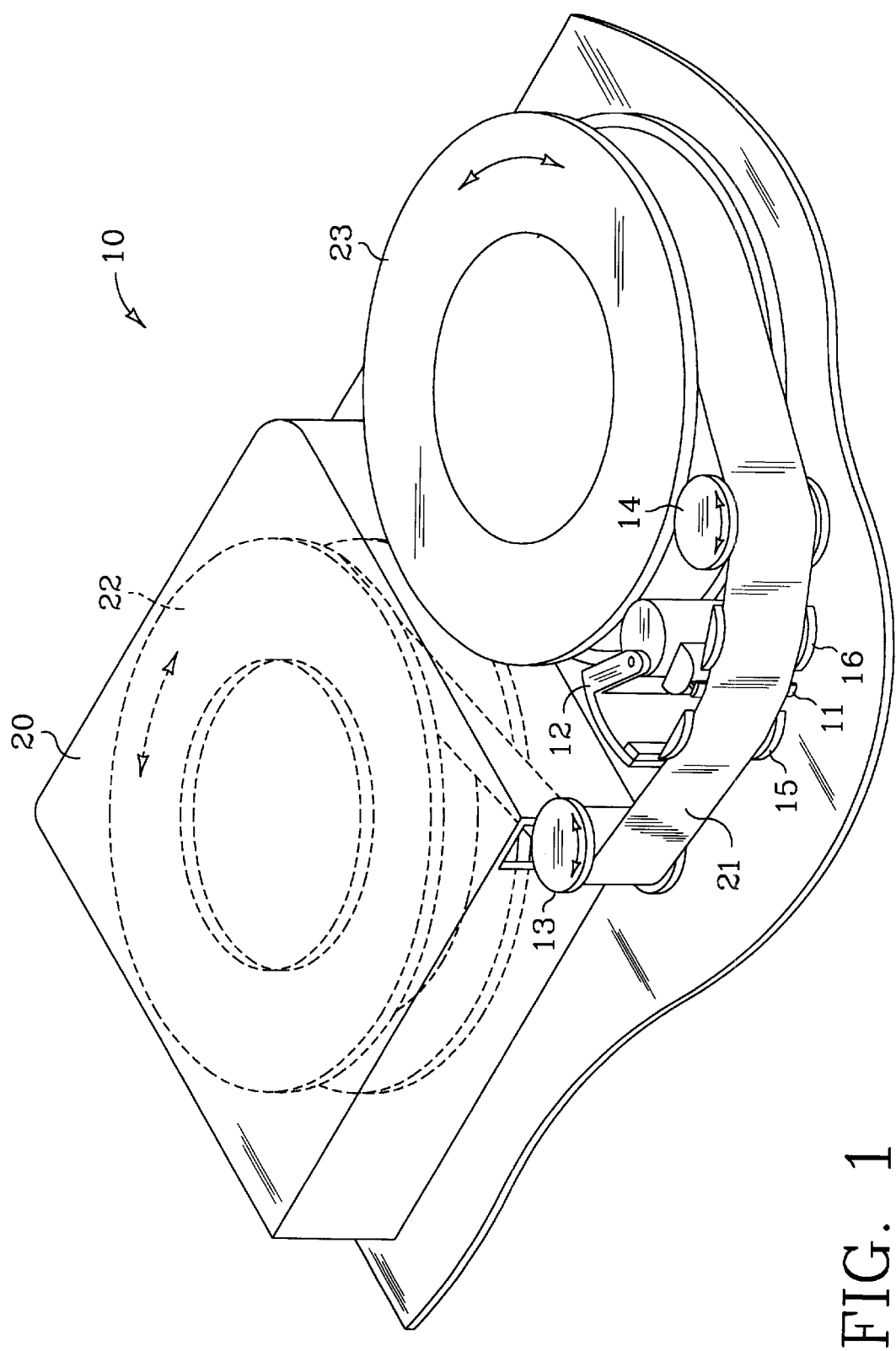
FIG. 1 is a perspective representational view of a tape drive including a tape cartridge and tape head cleaning device.

Referring to the Figures, a method of debris detection for detecting a particular fault as a cause of data transfer error on a data storage media is more fully described. FIG. 1 shows one configuration of tape drive 10 including tape cartridge 20 loaded therein. Tape drive 10 includes tape head 11 and tape head cleaning device 12 similar to the head cleaner described in U.S. Pat. No. 5,930,089. Tape 21 is wound about storage reel 22 held in tape cartridge 20 and take-up reel 23. Tape 21 is positioned for linear travel across tape head 11. Tape head cleaning device 12 is configured to permit movement directly against tape head 11. As shown in FIG. 1, tape 21 travels across roller guides 13 and 14, and stationary guides 15 and 16. Tape head 11 is positioned between stationary guides 15 and 16 so that tape 21 is tensioned against tape head 11 during normal operation.

Figure 2:
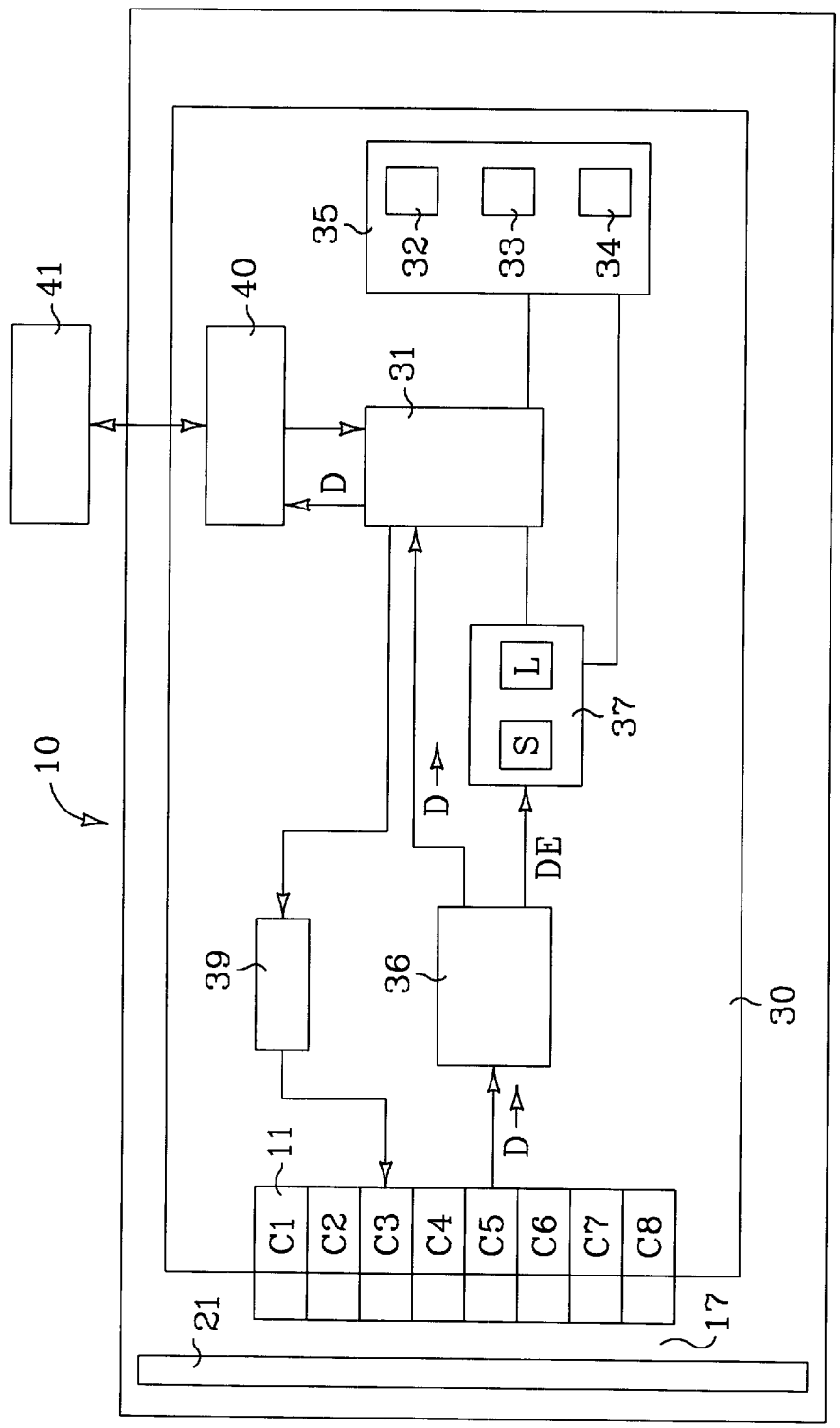
FIG. 2 is a schematic diagram of a tape drive.

FIG. 2 is a schematic diagram showing tape drive 10 including tape head 11. Tape drive 10 also includes control circuitry 30 including drive interface 40. Control circuitry 30 also includes controller 31 which controls the read/write operations of tape drive 10. Control circuitry 30 may include memory 35 for maintaining a variety of executable instructions including read procedure 32, write procedure 33 and drivers 34. A write operation may be performed by controller 31 executing write procedure 33. Data to be written onto tape 21 are encoded by controller 31 and transmitted to driver 39. Similarly, a read operation may be performed by controller 31 executing read procedure 32. Control circuitry 30 also includes ECC engine 36 and non-ECC error recovery module 37. Data input into and output from tape 21 are transmitted at tape/head interface 17. In a read operation, data D is conducted through ECC engine 36. If ECC engine 36 detects data transfer errors which are correctable by ECC engine 36, then the ECC engine 36 corrects the errors, and the corrected data is passed to controller 31.

In the event data signal D includes data transfer errors which are uncorrectable by ECC engine 36, controller 31 initiates operation of non-ECC error recovery module 37. Drive interface 40 permits connection to host 41.

Figure 3A:
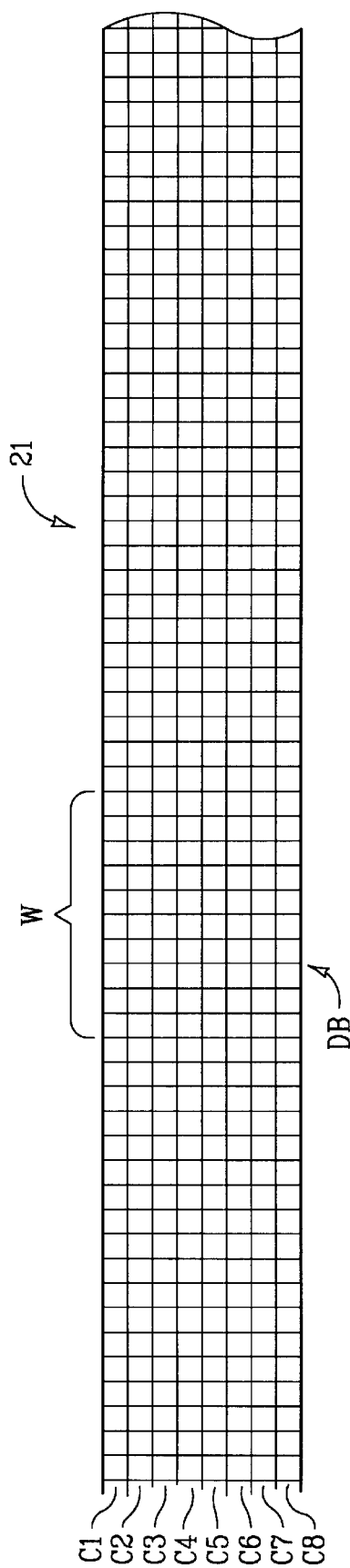
FIG. 3A is schematic diagram depicting a tape format for an eight channel tape drive.

FIG. 3A is schematic diagram depicting tape 21 including a format for an eight channel tape drive. Window W includes a matrix including a predetermined number of sequential data blocks DB.

Figure 3B:
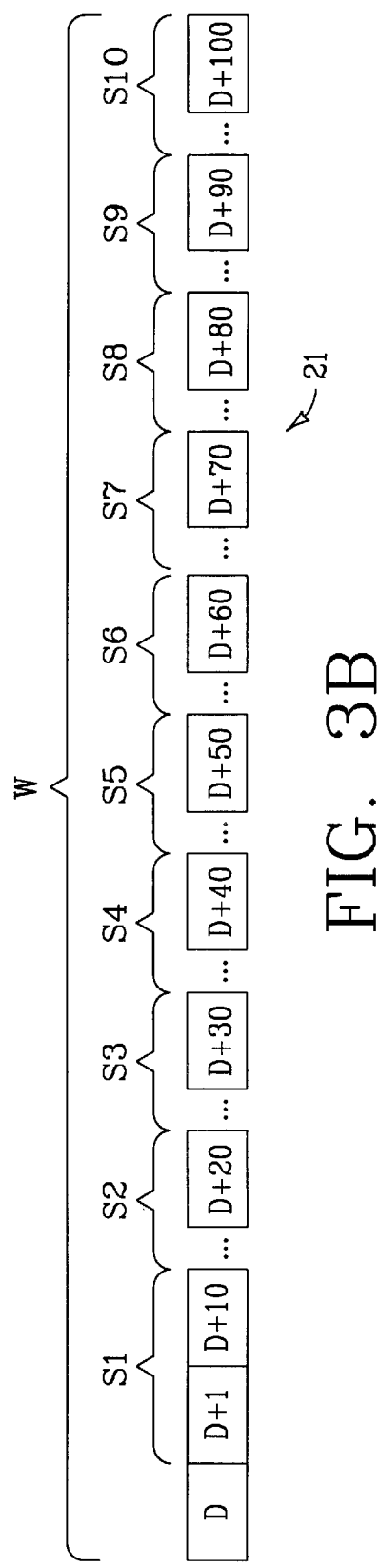
FIG. 3B is schematic diagram depicting a tape format for a single channel including sequential short-term error samples.

FIG. 3B is schematic diagram depicting tape 21 including a format for a single channel. Window W includes a plurality of sequential data blocks, in this case, D, D+1, D+2, . . . , D+100, each data block D−1, D, D+1, D+2, . . . including multiple bytes of data. A short-term error process calculates and monitors short-term error samples S1 through S10 which are viewed at any given time in window W. Short-term error samples S1 through S10 are defined as the number of bytes of data transfer error in a first predetermined number of sequential data blocks divided by the total number of bytes transferred in the first predetermined number of sequential data blocks. In this case, short-term error sample S1 is calculated for data blocks D+1through D+10, dividing the number of bytes of data transfer error in data blocks D+1 through D+10 by the total number of bytes transferred in data blocks D+1 through D+10. Similar calculations are performed for each of the plurality of sequential data blocks D, D+1, D+2, . . . D+100 viewed in window W. As tape 21 passes through window W, a new sample S1 is continuously calculated and monitored and short-term error sample S10 is continuously discarded as the plurality of sequential data blocks D, D+1, D+2, . . . , progress through window W.

Figures 4, 5:
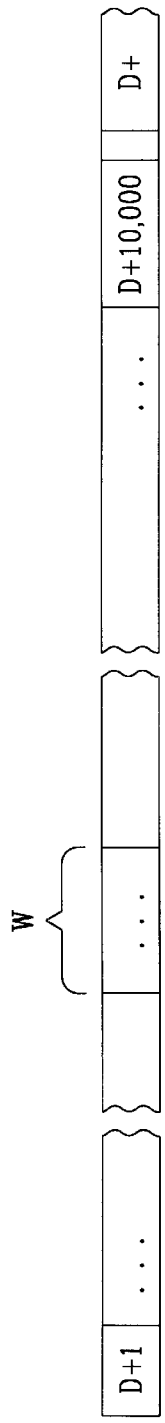
FIG. 4 is schematic diagram depicting a tape.
FIG. 5 is schematic diagram depicting a tape format for an eight channel tape drive including sequential short-term error samples.

Long-term error rate is defined as the total number of bytes in error in a plurality of processed sequential data blocks D, D+1, D+2, . . . , divided by the total bytes of data in the processed sequential data blocks D, D+1, D+2, . . . By way of illustration, FIG. 4 shows tape 21 including a plurality of sequential data blocks D+1, D+2, . . . D+10,000. For the purpose of illustration, it is assumed that each data block D+1, D+2, . . . D+10,000 further includes 100,000 bytes of data. Assuming that a non-ECC recoverable error occurs invoking the non-ECC recovery module at data block D+1000, the total bytes read would equal 100,000,000. Assuming, by way of illustration, that there were a total of 150,000 bytes of data error, the long-term error rate would equal 150,000/100,000,000, (0.00150).

As shown in FIGS. 3B, at any given time during operation of tape drive 10, window W includes 10 short-term error samples S1 through S10. Debris at tape/head interface 17 is detected if all short-term error samples S1 through S10 are higher than the long-term error rate. Short-term error samples S1 through S10 may increase, decrease, remain constant, or have no trend pattern. As long as all short-term error samples S1 through S10 are higher than the long-term error rate, then the process assumes there is debris at tape/head interface 17.

By way of example, and assuming, by way of illustration, data blocks D+1 through D+1000 have been read and that short-term error samples S1 through S10 at data blocks D+991 through D+1000 have the following values: S1 includes 550 bytes of data error, short-term error sample S2 includes 600 bytes of data error, short-term error sample S3 includes 650 bytes of data error, short-term error sample S4 includes 550 bytes of data error, short-term error sample S5 includes 600 bytes of data error, short-term error sample S6 includes 700 bytes of data error, short-term error sample S7 includes 650 bytes of data error, short-term error sample S8 includes 750 bytes of data error, short-term error sample S9 includes 900 bytes of data error and short-term error sample S10 includes 850 bytes of data error. Assuming for the purpose of illustration that each data block D+1, D+2, . . . includes 100,000 bytes of data, values for short-term error samples S1 through S10 would be as follows: S1 equals 550/1,000,000, (0.0055), S2 equals 600/1,000,000, (0.00060), S3 equals 650/1,000,000, (0.00065), S4 equals 550/1,000,000, (0.00055), S5 equals 600/1,000,000, (0.00060), S6 equals 700/1,000,000, (0.00070), S7 equals 650/1,000,000, (0.00065), S8 equals 750/1,000,000, (0.00075), S9 equals 900/1,000,000, (0.00090) and S10 equals 850/1,000,000, (0.00085). Assuming also for the purposes of the present illustration that there have been a total of 50,000 bytes of error in all data blocks D+1 through D+1000, long-term error rate equals 50,000/100,000,000, (0.00050). The example offered above indicates an accumulation of debris at head/media interface 17, as values for succeeding short-term error samples S1 through S10 are all larger than long-term error rate. Under normal operating conditions where head/media interface 17, shown in FIG. 2, is free of debris, short-term error samples S1 through S10 would have values slightly and randomly larger or smaller than long-term error rate. As debris accumulates gradually at head/media interface 17, the value of succeeding short-term error samples S1 through S10 will be larger than long-term error rate. Assuming that a non-ECC recoverable error occurs invoking the non-ECC recovery module at data block D+1000, a head cleaning process may be initiated based upon a evaluation of the above data.

Alternatively, if short-term error samples S1 through S10 increase in value, even thought the values for short-term error samples S1 through S10 are not higher than the long-term error rate, then the process assumes there is debris at head/media interface 17. By way of example, and assuming, by way of illustration, that data blocks D+1 through D+1000 have been read and that short-term error samples S1 through S10 at data blocks D+991 through D+1000 have the following values: S1 includes 210 bytes of data error, short-term error sample S2 includes 220 bytes of data error, short-term error sample S3 includes 230 bytes of data error, short-term error sample S4 includes 240 bytes of data error, short-term error sample S5 includes 250 bytes of data error, short-term error sample S6 includes 260 bytes of data error, short-term error sample S7 includes 270 bytes of data error, short-term error sample S8 includes 280 bytes of data error, short-term error sample S9 includes 290 bytes of data error and short-term error sample S10 includes 300 bytes of data error. Assuming for the purpose of illustration that each data block D+1, D+2, . . . includes 100,000 bytes of data, values for short-term error samples S1 through S10 would be as follows: S1 equals 210/1,000,000, (0.00021), S2 equals 220/1,000,000, (0.00022), S3 equals 230/1,000,000, (0.00023), S4 equals 240/1,000,000, (0.00024), S5 equals 250/1,000,000, (0.00025), S6 equals 260/1,000,000, (0.00026), S7 equals 270/1,000,000, (0.00027), S8 equals 280/1,000,000, (0.00028), S9 equals 290/1,000,000, (0.00029) and S10 equals 300/1,000,000, (0.00030). Assuming also for the purposes of the present illustration that there have been a total of 30,000 bytes of error in all data blocks D+1 through D+1000, long-term error rate equals 30,000/ 10,000,000, (0.00030).

The example offered indicates an accumulation of debris at head/media interface 17, as short-term error samples S1 through S10 increase in value, even thought the values for short-term error samples S1 through S10 are not all higher than the long-term error rate.

Referring again to FIG. 2, tape drive 10 is configured having read/write channels C1 through C8. Short-term error samples S1 through S10 may be calculated and monitored for each channel C1 through C8. FIG. 5 is schematic diagram depicting tape 21 formatted for eight channels. Window W includes a plurality of sequential data blocks, in this case, D+1, D+2, . . . , D+100, including multiple bytes of data for each channel C1 through C8. A short-term error process calculates and monitors short-term error samples S1 through S10, for each channel C1 through C8, which are viewed at any given time in window W.

FIG. 6 is schematic diagram depicting short-term error samples identified as S(j,k) where j is the channel number C1 through C8 and k is sample number S1 through S10. In this case, window W will include eighty short-term error samples S(j,k). Similarly, long-term error rates are identified as L(j), where j is the channel number C1 through C8. Eight separate long-term error rates L(j) are calculated, one for each channel C1 through C8.

FIG. 2 shows data transfer error DE uncorrectable by ECC engine 36. When an uncorrectable data transfer error DE is detected, controller 31 initiates non-ECC error recovery module 37. Once non-ECC error recovery module 37 is invoked, a comparison of short-term error samples S will be made to long-term error rate.

Figure 7:
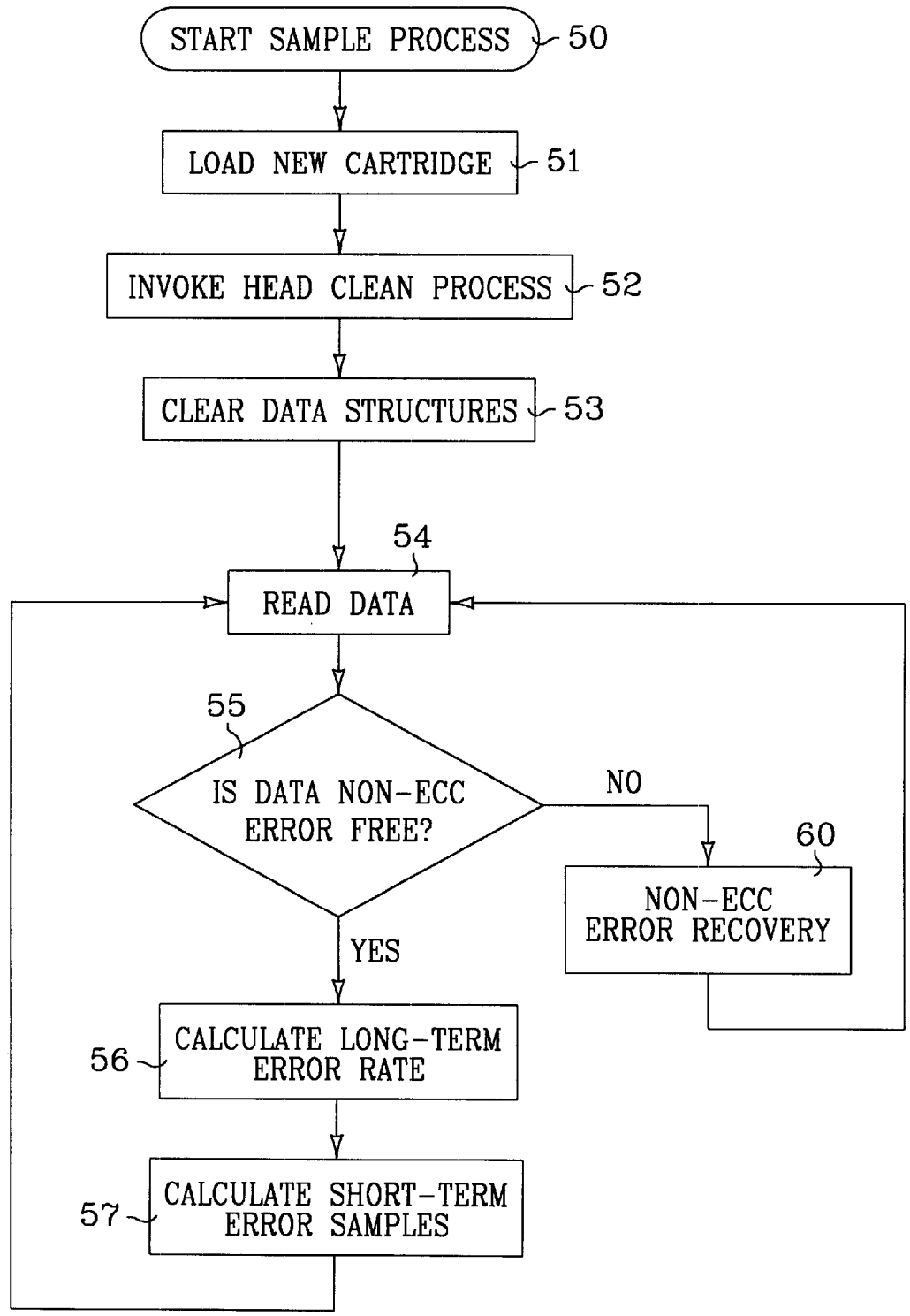
FIG. 7 is a flow chart depicting the steps of a method for computation of long and short-term error samples.

FIG. 7 is a flow chart depicting the steps of a method for the computation of long-term error rate and short-term error samples. The method for the computation is initiated at Start Sample Process 50. A tape cartridge is loaded at Load New Cartridge 51. Head Clean Cycle 52 may be invoked to warrant that tape head 11 is clean. Clear Data Structures 53 functions to assure that registers are cleared of any previous sample data. Next, Read Data 54 is initiated. Error correction and detection circuitry detects and corrects data transfer errors "on-the-fly" as data is transferred from the media at Is Data non-ECC Error Free? 55. As data is read, long-term error rate is computed at Compute Long-term Error Rate 56 and short-term error samples are calculated and monitored at Compute Short-term Error Samples 57. In the event that error correction and detection circuitry detects an error which is non-recoverable by the error correction and detection circuitry, non-ECC Error Recovery module 60 is invoked. So long as the data is free of error or data error is correctable and recoverable by the ECC, the process continues with Read Data 54 and Compute Long-term Error Rate 56 and Compute Short-term Error Samples 57.

Figure 8:
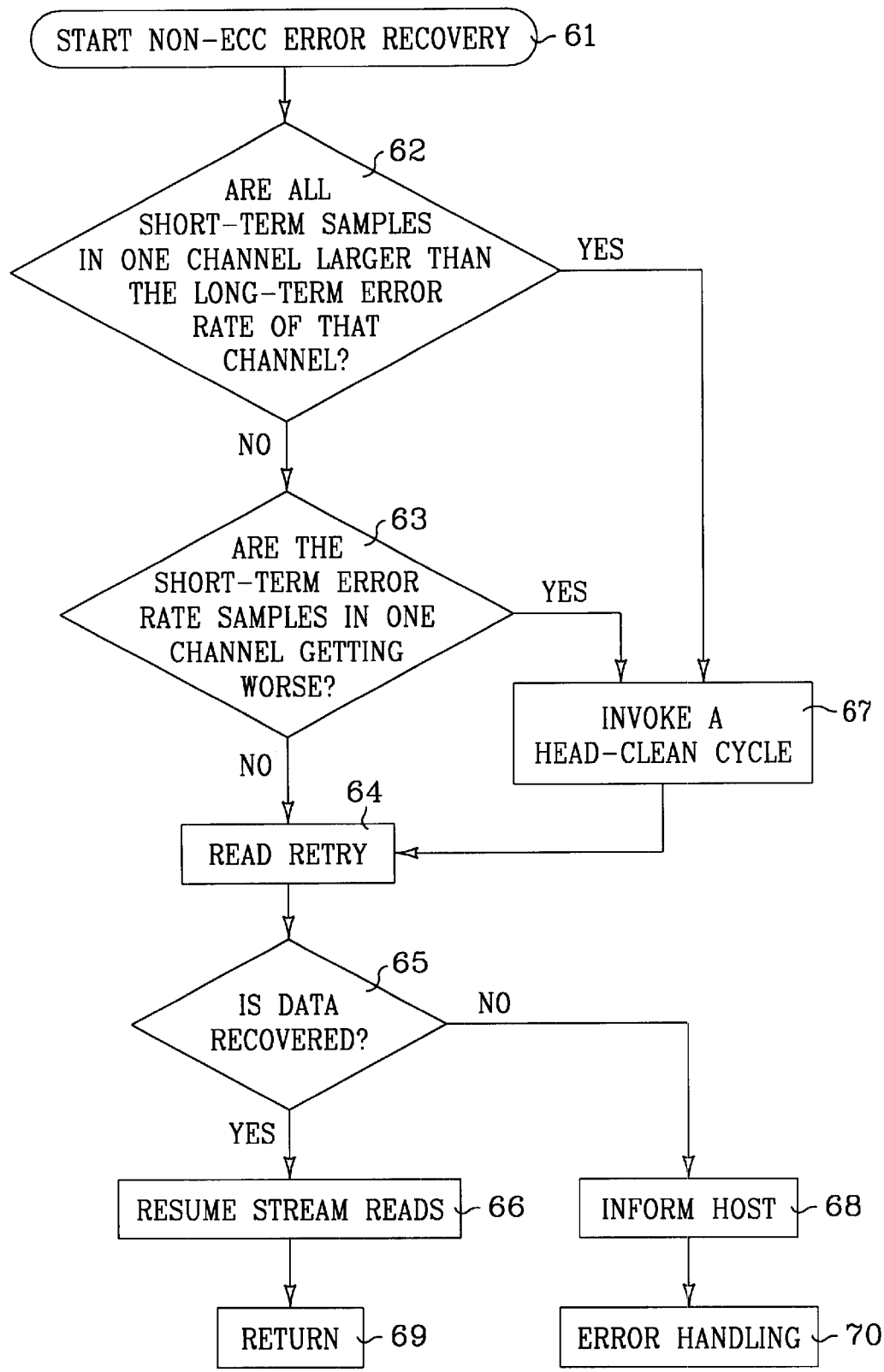
FIG. 8 is a flow chart depicting the steps of a non-ECC error recovery procedure.

FIG. 8 is a flow chart depicting the steps of non-ECC Error Recovery module 60. Start Non-ECC Error Recovery Procedure 61 initiates the non-ECC error recovery procedure. Data Comparison 62 operates to determine if short-term error samples S have deteriorated compared to long the term error rate. If all short-term error samples S are greater than the long term error rate, then an error recovery procedure is selected based upon such comparison of the short-term error samples to the long-term error rate. In this case, Invoke Head-Clean Cycle 67 is initiated followed by a retry of Retry Read Data 64. Data Comparison 63 operates to determine if sequential short-term error samples S have deteriorated gradually. If each successive sequential short-term error sample S is less than the next following sequential short-term error sample S then Invoke Head-Clean Cycle 67 is initiated followed by a retry of Retry Read Data 64. If short-term error samples S have neither deteriorated gradually nor abruptly then the data transfer error is commonly caused by a transient condition and a simple retry of Retry Read Data 64 oftentimes is sufficient to recover data.

Following Retry Read Data 64, Is Data Recovered? 65 determines if the an error recovery procedure has been successful. If the error recovery procedure has been successful, Resume Stream Reads 66 directs the process through RETURN 69 and normal operation resumes as shown in FIG. 7. If the head clean cycle has not been successful, Inform Host 68 signals the host 41 (shown in FIG. 2) and ERROR HANDLING 70 is enabled.

While this invention has been described with reference to the detailed embodiments, this is not meant to be construed in a limiting sense. Various modifications to the described embodiments, as well as additional embodiments of the invention, will be apparent to persons skilled in the art upon reference to this description. It is therefore contemplated that the appended claims will cover any such modifications or embodiments as fall within the true scope of the invention.

What is claimed is:

1. A method for detecting a fault causing a data transfer error, the method comprising:
   calculating a long-term error rate;
   calculating a short-term error sample;
   comparing the short-term error sample to the long-term error rate; and
   selecting an error recovery procedure based upon a result of a comparison of the short-term error sample to the long-term error rate.

2. The method for detecting a fault causing a data transfer error of claim 1 wherein the step of calculating a long-term error rate further comprises dividing a total number of bytes of data transfer error by a total number of bytes of data transferred.

3. The method for detecting a fault causing a data transfer error of claim 1 wherein the step of calculating a short-term error sample further comprises calculating a number of bytes of data transfer error in a predetermined number of sequential blocks of data divided by the total number of bytes transferred in the predetermined number of sequential blocks of data.

4. The method for detecting a fault causing a data transfer error of claim 1 wherein the step of comparing the short-term error sample to the long-term error rate further comprises determining if the short-term error sample is greater than the long-term error rate.

5. The method for detecting a fault causing a data transfer error of claim 1 wherein the step of selecting an error recovery procedure based upon a result of a comparison of the short-term error sample to the long-term error rate further comprises invoking a tape head cleaning process.

6. The method for detecting a fault causing a data transfer error of claim 1 wherein the step of selecting an error recovery procedure further comprises initializing a re-attempt to transfer data affected by the data transfer error.

7. A method for detecting debris causing data transfer error at a head/media interface, the method comprising:
   calculating a long-term error rate;
   calculating a plurality of sequential short-term error samples;
   comparing the plurality of sequential short-term error samples to the long-term error rate; and
   selecting an error recovery procedure based upon a result of a comparison of the plurality of sequential short-term error samples to the long-term error rate.

8. The method for detecting debris of claim 7 wherein the step of calculating a long-term error rate further comprises calculating a total number of bytes of data transfer error divided by a total number of bytes transferred.

9. The method for detecting debris of claim 7 wherein the step of calculating a plurality of sequential short-term error samples further comprises dividing a number of bytes of data transfer error in a predetermined number of sequential blocks of data divided by the total number of bytes transferred in the predetermined number of sequential blocks of data for each of the plurality of sequential short-term error samples.

10. The method for detecting debris of claim 7 wherein the step of comparing the plurality of sequential short-term error samples to the long-term error rate further comprises determining if each of the plurality of sequential short-term error samples are greater than the long-term error rate.

11. The method for detecting debris of claim 7 wherein the step of comparing the plurality of sequential short-term error samples to the long-term error rate further comprises determining if each of the plurality of sequential short-term error samples are greater than each individual preceding short-term error sample.

12. The method for detecting debris of claim 7 wherein the step of selecting an error recovery procedure further comprises invoking a tape head cleaning process.

13. The method for detecting debris of claim 7 wherein the step of selecting an error recovery procedure further comprises initializing a re-attempt to transfer data affected by the data transfer error.

14. A method for detecting debris causing data transfer error at a head/media interface, the method comprising:
   calculating a long-term error rate including a total number of bytes of data transfer error divided by a total number of bytes transferred;
   calculating a plurality of sequential short-term error samples by dividing a number of bytes of data transfer error in a predetermined number of sequential blocks of data divided by the total number of bytes transferred in the predetermined number of sequential blocks of data for each of the plurality of sequential short-term error samples;
   comparing the plurality of sequential short-term error samples to the long-term error rate; and
   selecting an error recovery procedure based upon a result of a comparison of the plurality of sequential short-term error samples to the long-term error rate.

15. The method for detecting debris of claim 14 wherein the step of comparing the plurality of sequential short-term error samples to the long-term error rate further comprises determining if each of the plurality of sequential short-term error samples are greater than the long-term error rate.

16. The method for detecting debris of claim 14 wherein the step of comparing the plurality of sequential short-term error samples to the long-term error rate further comprises determining if each of the plurality of sequential short-term error samples are greater than each individual preceding short-term error sample.

17. The method for detecting debris of claim 14 wherein the step of selecting an error recovery procedure further comprises invoking a tape head cleaning process.

18. The method for detecting debris of claim 14 wherein the step of selecting an error recovery procedure further comprises initializing a re-attempt to transfer data affected by the data transfer error.

* * * * *